(12) United States Patent
Sepe, Jr.

(10) Patent No.: US 6,895,380 B2
(45) Date of Patent: May 17, 2005

(54) VOICE ACTUATION WITH CONTEXTUAL LEARNING FOR INTELLIGENT MACHINE CONTROL

(75) Inventor: Raymond Sepe, Jr., Medfield, MA (US)

(73) Assignee: Electro Standards Laboratories, Cranston, RI (US)

( * ) Notice: Subject to any disclaimer, the term of this patent is extended or adjusted under 35 U.S.C. 154(b) by 658 days.

(21) Appl. No.: 09/796,799

(22) Filed: Mar. 2, 2001

(65) Prior Publication Data

US 2001/0047265 A1 Nov. 29, 2001

Related U.S. Application Data

(60) Provisional application No. 60/186,469, filed on Mar. 2, 2000.

(51) Int. Cl.[7] .......................... G10L 21/06; G10L 15/04; G10L 15/14; G05D 1/00
(52) U.S. Cl. ...................... 704/275; 704/251; 704/240; 704/256; 73/788; 73/791; 73/834; 73/862.07; 701/23; 701/27
(58) Field of Search ...................... 73/826–837, 862.07; 704/275, 235, 270, 244, 10, 251, 240; 700/145, 83; 713/200, 600; 701/1; 382/149; 709/250

(56) References Cited

U.S. PATENT DOCUMENTS

| 3,946,157 | A |   | 3/1976  | Dreyfus ...................... 179/1 SA |
|-----------|---|---|---------|------------------------------------------|
| 4,462,080 | A |   | 7/1984  | Johnstone et al. ........ 364/513.5      |
| 4,776,016 | A | * | 10/1988 | Hansen ........................ 704/275  |
| 4,780,906 | A | * | 10/1988 | Rajasekaran et al. ........ 704/240      |
| 4,829,576 | A | * | 5/1989  | Porter ........................ 704/235  |
| 4,896,357 | A |   | 1/1990  | Hatano et al. ................ 381/43    |
| 5,230,023 | A | * | 7/1993  | Nakano ...................... 704/275    |
| 5,544,256 | A | * | 8/1996  | Brecher et al. ............. 382/149     |
| 5,579,436 | A | * | 11/1996 | Chou et al. ................. 704/244    |
| 5,642,291 | A | * | 6/1997  | Prunotto et al. ............ 700/145     |
| 5,671,426 | A | * | 9/1997  | Armstrong, III ............. 704/10      |
| 5,748,843 | A | * | 5/1998  | Peck et al. .................. 704/276   |
| 5,774,357 | A | * | 6/1998  | Hoffberg et al. ........... 713/600      |
| 5,865,626 | A | * | 2/1999  | Beattie et al. .............. 704/240    |
| 5,867,386 | A | * | 2/1999  | Hoffberg et al. ............. 700/83     |
| 5,995,929 | A | * | 11/1999 | Gupta ........................ 704/251   |
| 6,208,971 | B1| * | 3/2001  | Bellegarda et al. ......... 704/275      |
| 6,236,909 | B1| * | 5/2001  | Colson et al. ................. 701/1    |
| 6,574,672 | B1| * | 6/2003  | Mitchell et al. ............ 709/250     |
| 2001/0056544 | A1| * | 12/2001 | Walker ....................... 713/200 |

FOREIGN PATENT DOCUMENTS

JP        05-241594     *   9/1993   ............. G10L/3/00

OTHER PUBLICATIONS

SRI ("Flakey: SRI's Mobile Robot", SRI International's Artificial Intelligence Center—http://www.ai.sri.com/people/flakey/ ©1995.*

(Continued)

*Primary Examiner*—Richemond Dorvil
*Assistant Examiner*—Daniel A. Nolan
(74) *Attorney, Agent, or Firm*—Lacasse & Associates, LLC; Randy W. Lacasse; Ramraj Soundararajan

(57) ABSTRACT

An interactive voice actuated control system for a testing machine such as a tensile testing machine is described. Voice commands are passed through a user-command predictor and integrated with a graphical user interface control panel to allow hands-free operation. The user-command predictor learns operator command patterns on-line and predicts the most likely next action. It assists less experienced operators by recommending the next command, and it adds robustness to the voice command interpreter by verbally asking the operator to repeat unlikely commanded actions. The voice actuated control system applies to industrial machines whose normal operation is characterized by a nonrandom series of commands.

24 Claims, 11 Drawing Sheets

OTHER PUBLICATIONS

Hauptmann et al ("Driving Environment Recognition For Adaptive Automotive Systems", Proceedings of the Fifth IEEE International Conference on Fuzzy Systems, Sep. 1996).*

Dirk Bühler et al ("Safety And Operating Issues For Mobile Human–Machine Interfaces", Proceedings of the 2003 international conference on intelligent user interfaces, Jan. 2003).*

Monkowski et al ("Context Dependent Phonetic Duration Models For Decoding Conversational Speech", International Conference on Acoustics, Speech, and Signal Processing, May 1995).*

Truscott ("Composite Active Suspension For Automotive Vehicles", Computing & Control Engineering Journal, Jun. 1994).*

* cited by examiner

Prior Art

VOICE ACTUATION WITH CONTEXTUAL LEARNING FOR INTELLIGENT MACHINE CONTROL

RELATED APPLICATIONS

The present application claims the benefit of provisional patent application "Voice Actuation with Context Learning for Intelligent Machine Control", Ser. No. 60/186,469, filed Mar. 2, 2000.

BACKGROUND OF THE INVENTION

1. Field of Invention

The present invention relates generally to the field of machine control. More specifically, the present invention is related to a system and method for voice actuation, with contextual learning, for intelligent machine control.

2. Discussion of Prior Art

Much prior art work has been devoted to developing graphical user interface (GUI) tools for machine control. FIG. 1 illustrates a prior art scenario wherein users utilize a computer 102, with display capabilities, to monitor a programmable device 104. Computer 102 communicates with the device 104 via a communication link 106. In most prior art systems, a GUI is displayed on computer 102 via which users control the functionality of programmable device 104. Users are able to manipulate the GUI by entering commands (via a keyboard) or by clicking on an appropriate area of the GUI (using a mouse).

One of the problems associated with such a setup is that in most industrial programmable devices, a process has to be repeated more than once and it becomes tiring on the part of the operator to repeat a sequence of commands. In addition to being tiring, in the case of testing, some tests require the operator to handle or manipulate the sample in some fashion during the test. For example, some types of peel test require the operator to make slices in the sample during testing. Therefore, it would be beneficial to have an easy-to-use interactive voice actuated control system with an enhanced GUI interface for intelligent machine control.

The following references describe prior art in the filed of voice activated control of devices, but none provide for voice activated control of a testing machine using a statistical prediction algorithm. Furthermore, none of the prior art provide for reliable machine operation via a system receiving voice inputs and providing intelligent help for operation of the machine. Additionally, none of the prior art described below provides for a filter for validating commands before executing them in a machine. The prior art described below is similar to the system described in FIG. 1.

U.S. Pat. No. 5,748,843 discloses an apparatus wherein an operator controls specific operations of apparel manufacture equipment through verbal commands recognized by the equipment as distinct from other sounds in the environment and of the equipment. The speech recognition computer also preferably maintains the capability to recognize words or commands.

U.S. Pat. No. 4,462,080 discusses an apparatus for controlling a computer-controlled system, such as a computer numerically controlled (CNC) machine tool, in accordance with voice commands spoken by a human operator.

U.S. Pat. No. 4,896,357 describes an industrial playback robot, which comprises speech discriminating means for discriminating the kind of teaching datum from a speech input, and the teaching datum is stored into a memory means as a teaching datum. Additionally, U.S. Pat. No. 3,946,157 provides for an improved speech recognition device for controlling a machine.

It should however be noted that none of the prior art references mentioned above provide for encompassing voice and context in a testing machine. Furthermore, none of the references mentioned above provide for a statistical algorithm that predicts most likely actions of users. Whatever the precise merits, features and advantages of the above cited references, none of them achieve or fulfills the purposes of the present invention.

SUMMARY OF THE INVENTION

The present invention provides for a voice actuated control system with contextual learning for a testing device (such as an industrial tensile testing machine). An adaptive command predictor adds robustness to the voice command interpreter by evaluating each candidate command in the context of the operator's usage pattern. The command predictor is also integrated with a GUI interface panel such that an intelligent user assist function is naturally created. The command predictor is based on a statistical Markov model that adapts to the machine operator's usage patterns. This context-learning algorithm is most effective when machine operation is nonrandom. In this way, next command recommendations based on probability distributions are most meaningful. This technology is useful in the industrial setting to reduce operator fatigue, allow freedom of movement, assist the physically challenged, and improve productivity.

Furthermore, the present invention provides for intelligent help based on adaptive context learning of operator commands. The embedded discrete Markov model of the users' commands provides for this intelligent system that essentially determines the user's degree of expertise when using the machine and helps to direct proper operations.

In an extended embodiment, the system of the present invention is used in smart automobiles to learn driver's operating patterns and adjust the vehicle handling and performance based on this self-learned information.

Furthermore, such a system can be used in industrial environments for voice actuation with adaptive context learning to reduce the probability of false actuation.

BRIEF DESCRIPTION OF THE DRAWINGS

FIG. 11 illustrates the various embodiments the system described in FIG. 3 can be used with.

DESCRIPTION OF THE PREFERRED EMBODIMENTS

Figure 1:
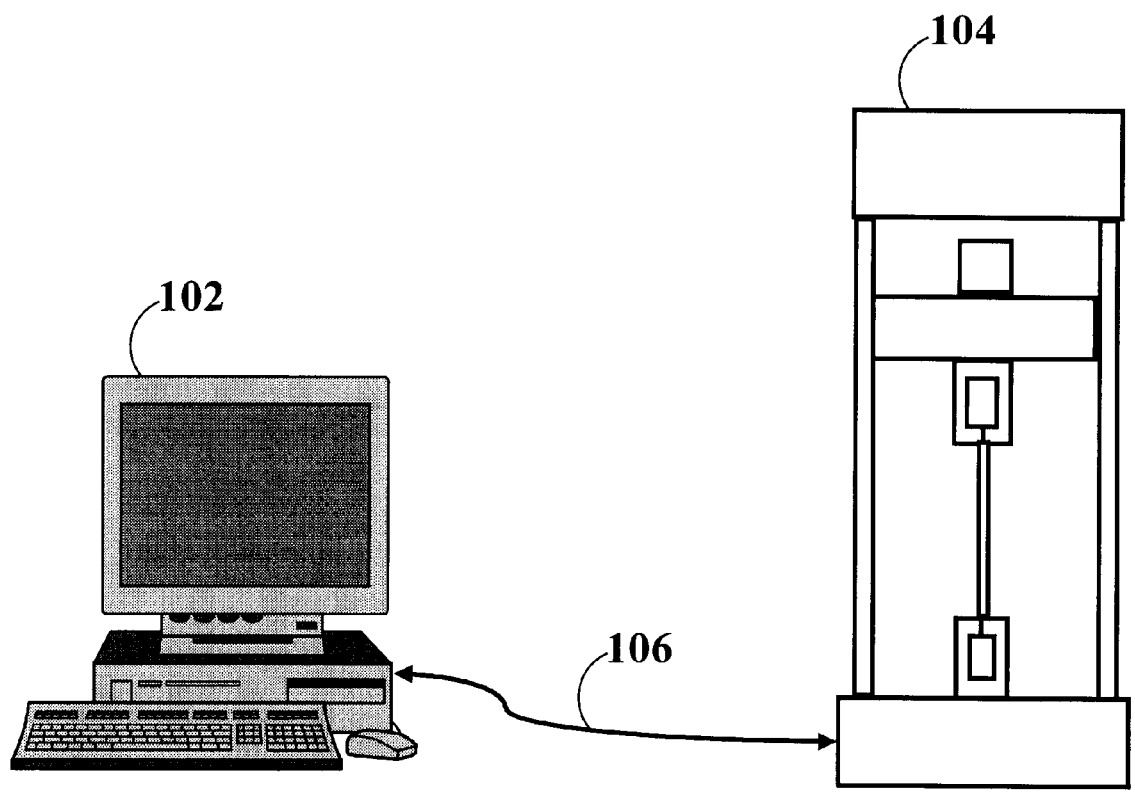
FIG. 1 illustrates a prior art scenario wherein users utilize a computer with display capabilities to monitor a programmable device.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides a system and method for intelligent help based on adaptive contextual learning of operator commands via an embedded statistical Markov model. In the example to follow, an industrial tensile testing machine is used to illustrate various embodiments of the system. But, one skilled in the art can implement the system of the present invention in other equivalent testing machines without departing from the scope of the present invention. Described below is such a tensile testing machine and its various functional components.

Figure 2:
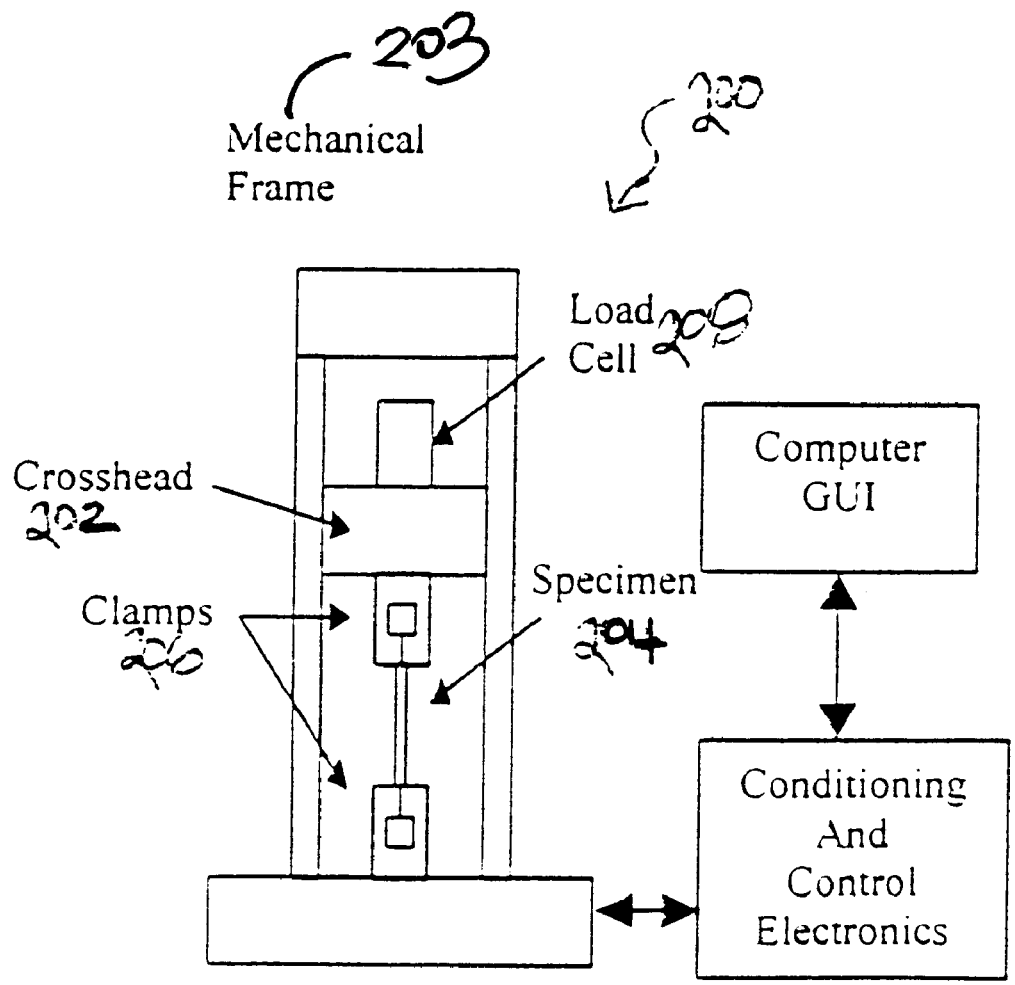
FIG. 2 illustrates a materials testing system wherein crosshead of the mechanical load frame is moved up and down in order to stretch or compress the specimen under test.

FIG. 2 illustrates a materials testing system 200 wherein crosshead 202 of the mechanical load frame 203 is moved up and down in order to stretch or compress the specimen 204 under test. Specimen 204 is held by means of clamps 206. Load cell 208 provides force data and an integral quadrature encoder (not shown) provides position information. In tensile mode, the specimen is stretched to the breaking point under computer control while real time data is acquired. The present invention provides for a voice actuated control system with context learning for such a testing device. Given below is a description of the system architecture.

System Architecture

Figure 3:
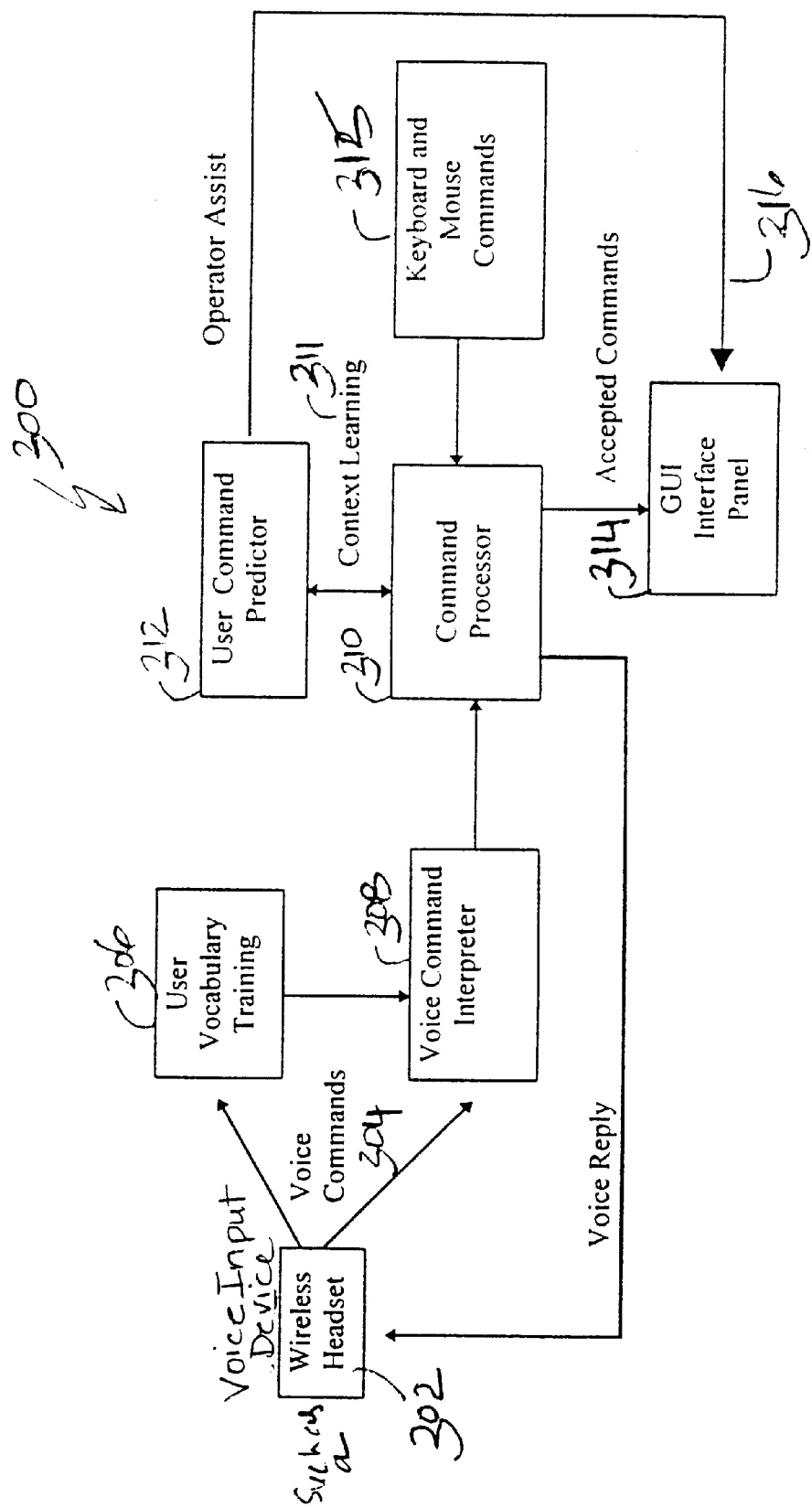
FIG. 3 is a block diagram of the system architecture of the present invention.

FIG. 3 is a block diagram of the system architecture 300 of the present invention. An operator uses voice input device 302 (such as a wireless headset) to issue voice commands 304 to the system. Manual input such as with a keyboard or mouse is also within the scope of the present invention. It should be noted that prior to tester operation, an individual user trains the speech recognition system (as described below), via user vocabulary training 306 and voice command interpreter 308, until satisfactory command recognition is achieved.

Figure 4:
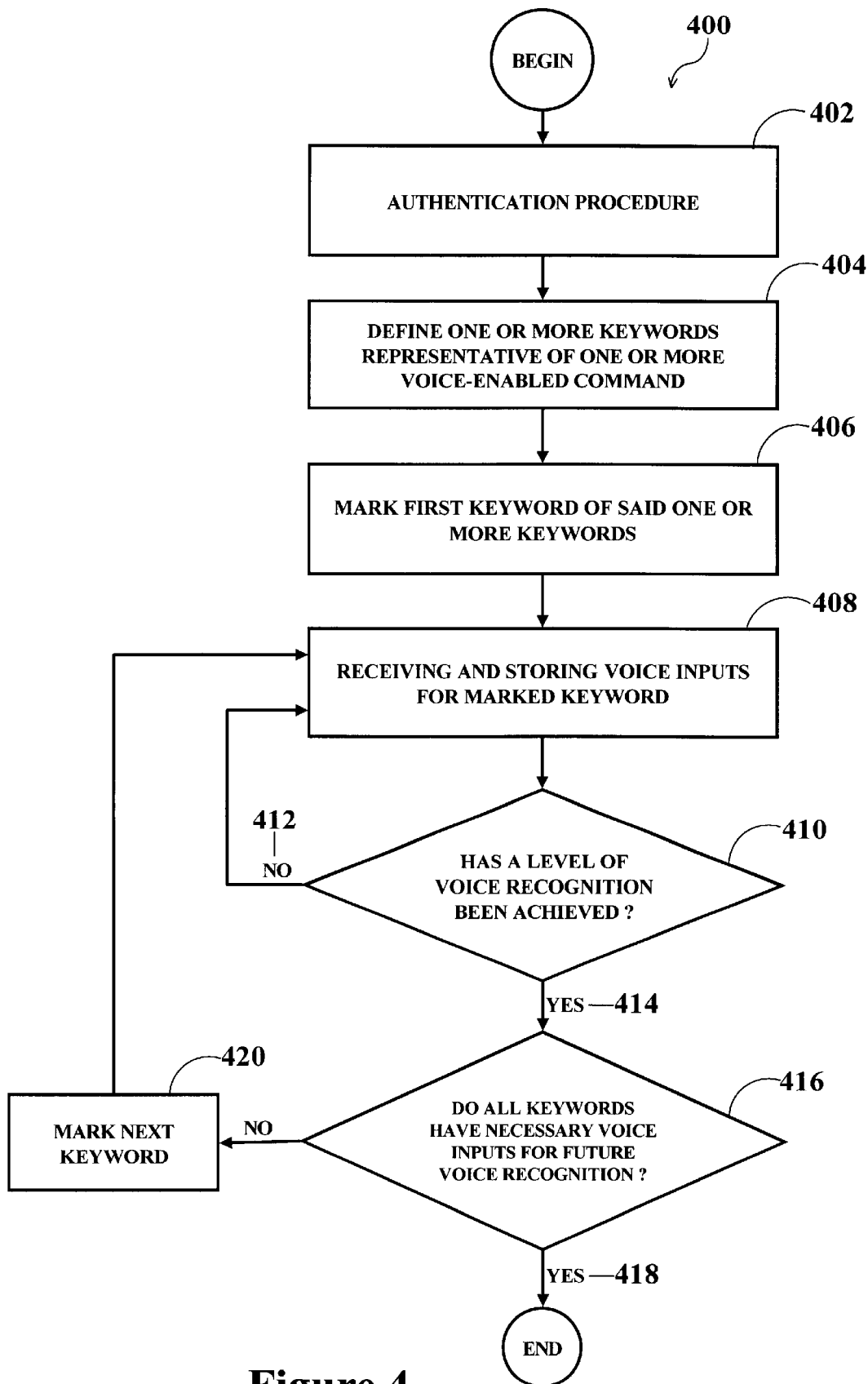
FIG. 4 illustrates the method for training the speech recognition system until a satisfactory level of command recognition is achieved.

FIG. 4 illustrates method 400 for training the speech recognition system until a satisfactory level of command recognition is achieved. The procedure begins with an authentication procedure (step 402) wherein a user is authenticated via a username and password. Upon validation, users define one or more keywords representative of one or more voice-enabled commands (step 404). Next, the first of the keywords is marked for processing (step 406), and voice inputs for the marked keyword are received via the voice input device (step 408). Furthermore, the received voice input is stored in a storage device that is operatively connected to the system. Next, the system checks (step 410) to see if a satisfactory level of speech recognition has been achieved based on the voice inputs for the marked keyword. If a satisfactory level has not been achieved (step 412), then the system requests more voice inputs for the marked keyword. On the other hand, if a satisfactory level has been reached (414), the system marks the next keyword for processing (step 420) and repeats steps 408 through 416 until all necessary voice inputs for all keywords have been obtained (step 418).

As stated above, the command vocabulary consists of one or more multiword commands. During tester operation, the voice command interpreter sends recognized commands to the command processor. Going back to the system diagram in FIG. 3, command processor 310 does not accept the commands until the user command predictor 312 validates them. In this way, the chance of unintended machine actions due to improper speech recognition is reduced. This can be especially important in an industrial environment where significant background noise may exist.

User command predictor 312 is responsible for learning the context 311 in which a given command is being issued, both from the voice system and from the keyboard and mouse 315. This is accomplished using a discrete-time Markov chain to estimate the statistical likelihood of each candidate next command. In the event that a very unlikely command is presented to command processor 310, the voice reply system asks the user to repeat the command. Once accepted, valid commands are used to update the Markov chain probabilities, resulting in on-line contextual learning 311.

The output of user command predictor 312 is also fed directly 316 to GUI interface panel 314 to provide intelligent help. The Markov command predictor is used quite naturally to recommend the next most probable action thereby providing a dynamic assist to the machine operator.

Voice Command Processing

Voice processing software used in conjunction with the present invention handles the low level voice processing tasks, including user vocabulary training and spoken command recognition or rejection. An example of software that can be used in conjunction with this invention is the Dragon Dictate Software® from Dragon Systems, Inc®.

Upon first time login on the tester system, a new user trains the speech recognition system by repeating keywords that are then associated with each of the one or more voice-enabled commands. The keywords are user defined, and can, therefore, be of any language or dialect. The tester system maintains a separate vocabulary file for each registered user. It should be noted that although the system is able to maintain a separate vocabulary file for each registered user, it also allows each user to have several of his own vocabulary files that he can choose from. This allows for training of the system under different noise background conditions that may exist in an industrial environment as other machines are being used or surrounding operations are being conducted.

Typical training requires repeating a keyword between three and eight times. The training algorithm signals the operator when a reliable level of voice recognition has been achieved for each keyword. Once trained, recognized speech commands are communicated to the command processor as candidate actions to be taken.

Command Prediction

A typical application of industrial material testers is repeated by testing of a particular batch or sample set of like product. The operator repeats the same or a similar sequence of operations for each sample. User command predictor 312 (FIG. 3) is designed to automatically learn and recognize these operator usage patterns. Moreover, the learning is continuous, so that the system actually adapts to any pattern variations.

A discrete-time Markov chain is used to develop a statistical model of the operator's usage pattern. Operation of the tester is partitioned into discrete states. Commands from the keyboard, button clicks from the mouse, and voice commands can all initiate a state transition. Associated with each state transition path is a probability value that indicates the likelihood of its activation. With each valid command, a state transition occurs, and the probabilities associated with each transition are then updated. As the operator continues to use the tester, state transition probabilities evolve. They indicate which is the next most likely command that will be received, given the present state of the machine. This information can then be used for command prediction. The user is prompted to repeat commands below a preset minimum likelihood threshold. Only verified low-likelihood commands are accepted as valid and processed.

Figure 5A:
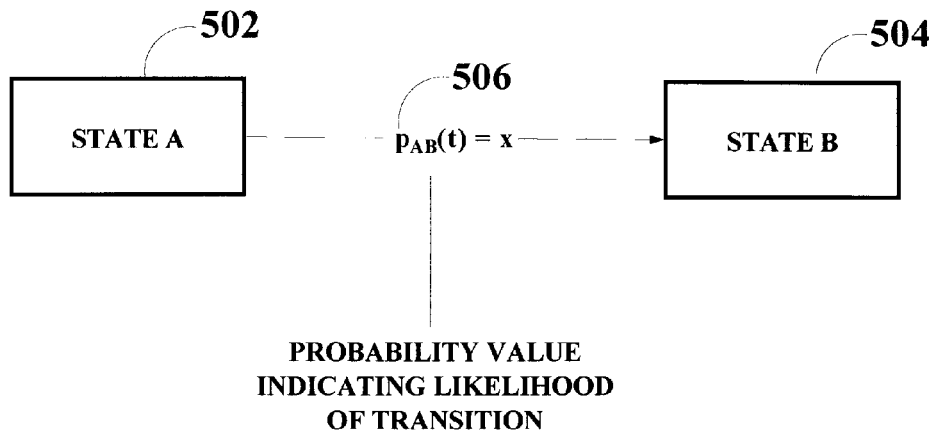
FIGS. 5a and 5b collectively illustrate how transition between different states affects the probability of transition of the path between the states.
Figure 5B:
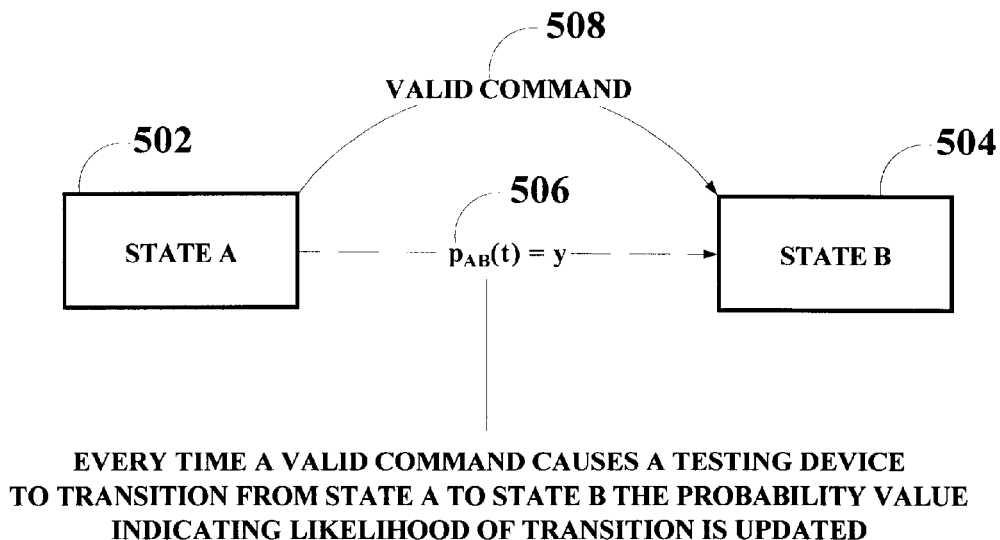

FIG. 5a and 5b collectively illustrate how transition between different states affect the probability of transition of the path between the states. If two states exist: State A 502 and state B 504, there is also a probability value 506, $p_{AB}(t)=x$, associated with the path between the two states, indicating the likelihood of transition. In the event the user provides a valid command 508, and the command causes a transition from State A 502 to State B 504, this probability value is updated 506 ($p_{AB}(t)=y$) indicating that the likelihood of transition has increased. Thus, the transition probabilities are adaptively modified and therefore are helpful later in predicting erroneous command inputs on the part of the user.

Figure 6:
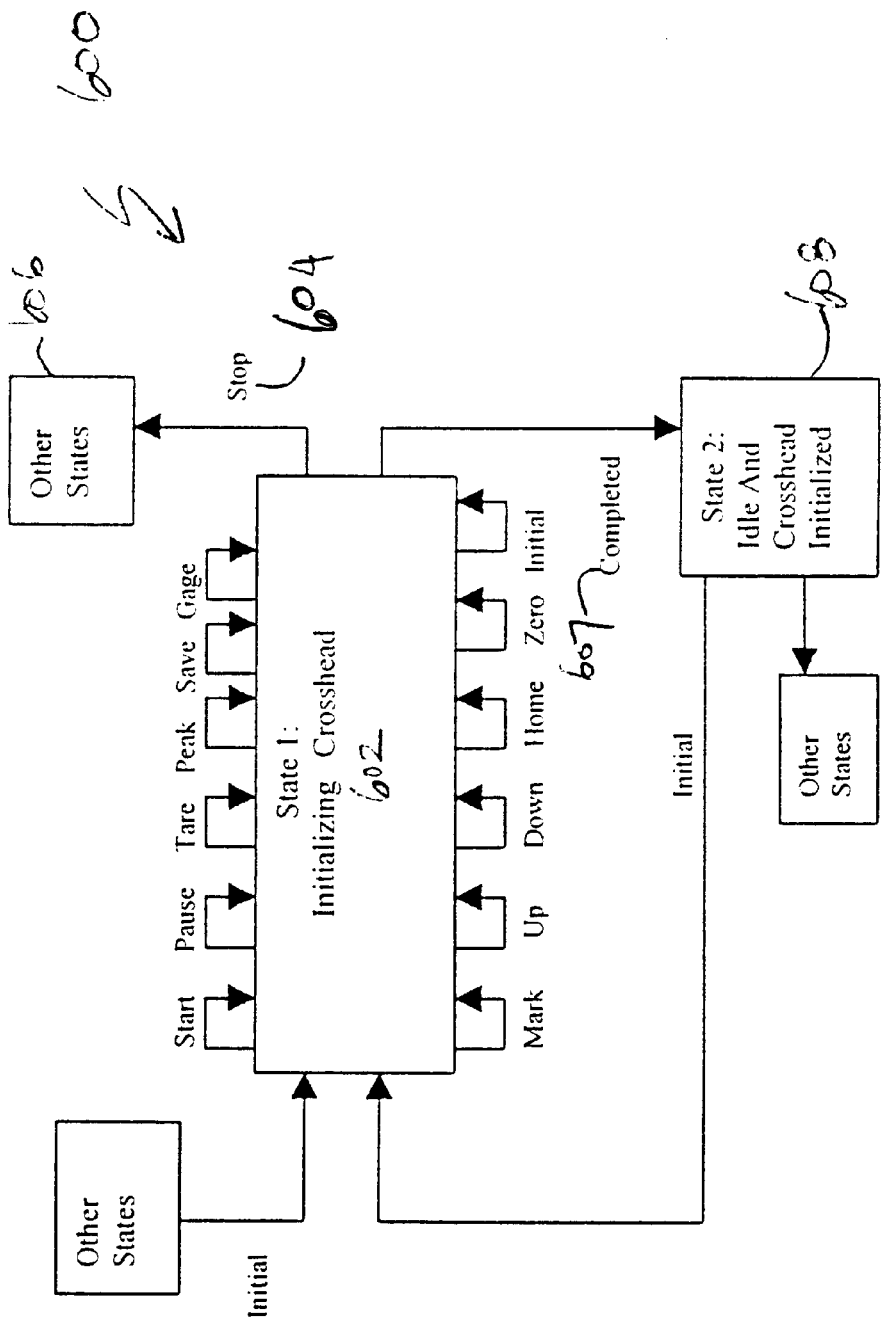
FIG. 6 shows a portion of the tester's state diagram.

FIG. 6 shows a portion of the tester's state diagram 600. State 1 602 is active when the tester is initializing the crosshead to its zero position location. In this case, many of the button commands do not change the state. But, it should be noted that stop transition 604 will move the system to other states 606. Furthermore, it is seen that when the positioning of the crosshead has been completed 607, the system moves to state 2 608.

Table 1 shows a typical set of state transition probabilities associated with 13 system commands (column 1) when the system is in the state: Initializing Crosshead (column 2), and when it is in the state: Test Finished (column 3).

TABLE 1

State transition probabilities for two states:
Initializing crosshead and test finished.

| Command | State: Initializing Crosshead Probability (%) | State: Test Finished Probability (%) |
|---|---|---|
| Start | 0.98 | 10.64 |
| Pause | 0.98 | 0.82 |
| Tare | 0.98 | 0.82 |
| Peak | 0.98 | 0.82 |
| Stop | 88.24 | 0.82 |
| Save | 0.98 | 33.61 |
| Gage | 0.98 | 0.82 |
| Mark | 0.98 | 0.82 |
| Up | 0.98 | 11.48 |
| Down | 0.98 | 9.84 |
| Home | 0.98 | 10.68 |
| Zero | 0.98 | 9.02 |
| Initial | 0.98 | 9.84 |

It is seen from the table that when the crosshead is initializing, the most likely command is to stop it, since the probability of transition associated with this command is 88.24%. On the other hand, when a test is finished, the most likely command is to save the data, since this command has the highest probability (33.61%) of causing a transition in this state.

Figure 7:
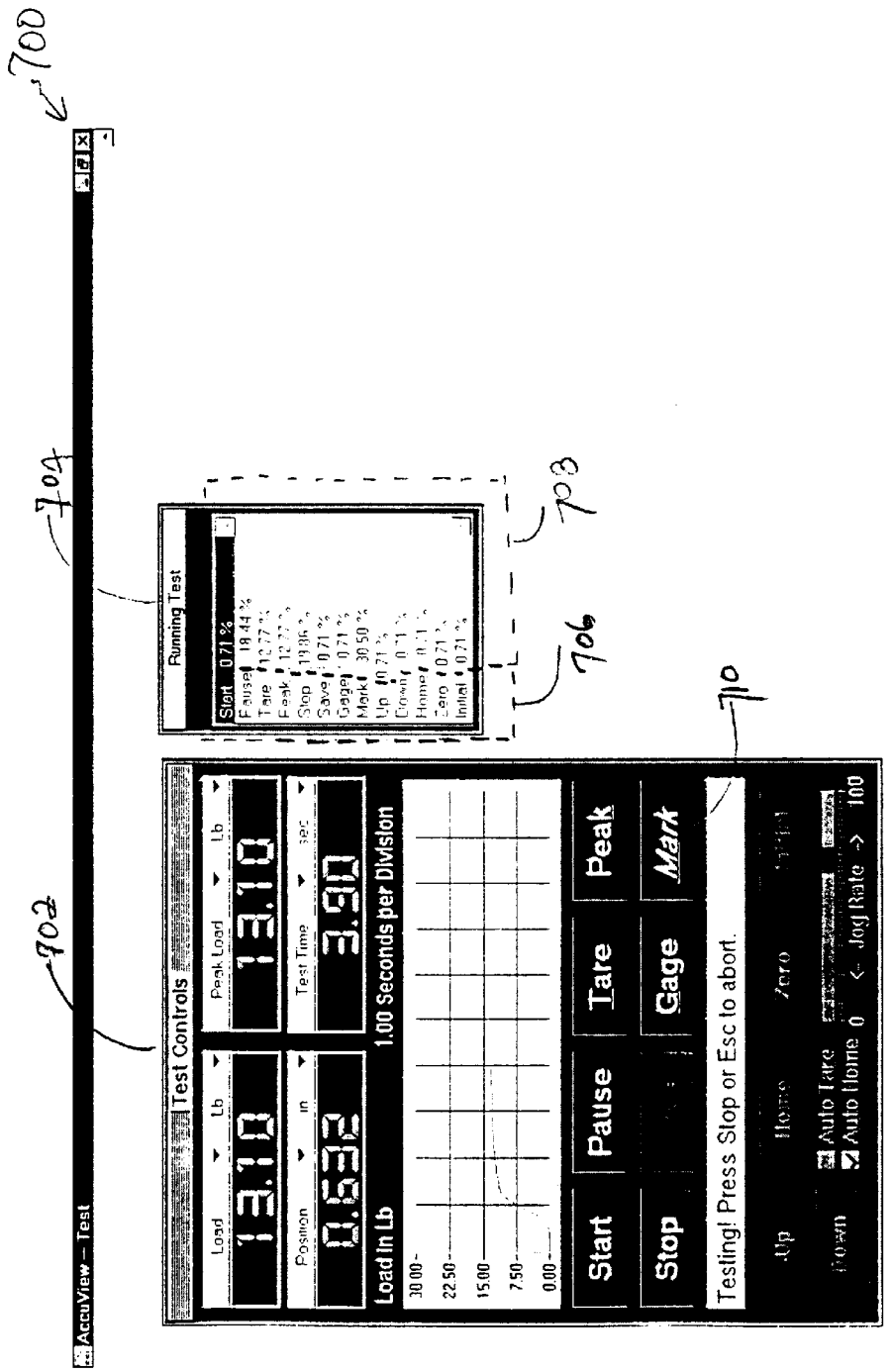
FIG. 7 illustrates the behavior of the implemented system during a test.

FIG. 7 illustrates a GUI 700 showing the behavior of the implemented system during a test. There are two panels shown. The leftmost panel is the GUI interface panel 702. The rightmost panel 704 is used to indicate the present Markov state of the test system, and the probabilities associated with each next command. This panel consists of a list of commands 706 and a list of probabilities 708 associated with each of the commands in list 706. Each command can be activated either by a mouse click on the GUI panel, the keyboard, or by voice commands. In a further embodiment, the command with highest probability of transition is displayed with a visual modification to indicate that it is the next likely command. For example, it should be noted that 'Mark' button 710 is italicized on the GUI panel because it is the next most likely command, with a probability of 30.50%. This command is used to place reference marks in the data set during a test. Therefore, the command predictor assists the operator by suggesting the next most likely command.

Figure 8:
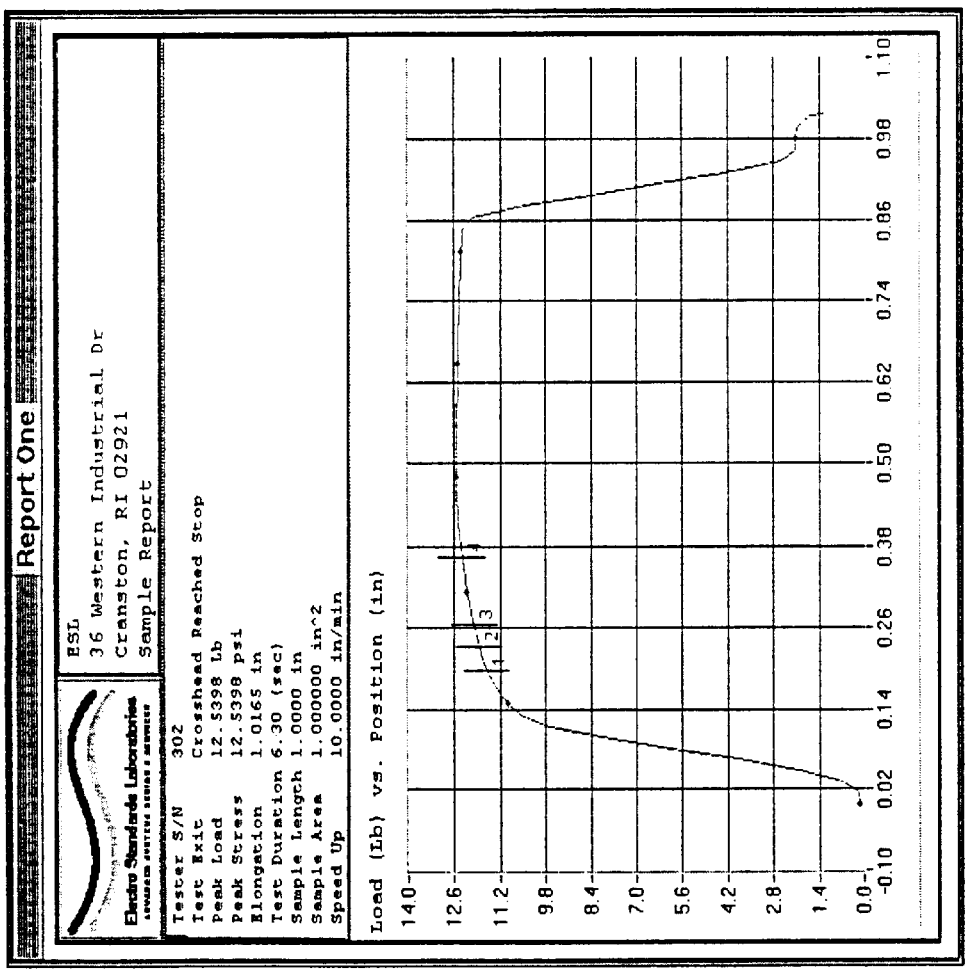
FIG. 8 is an example of a data report output from the tensile test system after successfully performing a tensile test on a wire specimen.

FIG. 8 is an example of a data report output from the tensile testing system after successfully performing a tensile test on a wire specimen. It should be noted that the marks in the data labeled '1', 2', and '3' were placed in the data via voice command activating the 'Mark' button 710 (FIG. 7) during the test. Furthermore, in the course of using speech recognition to place demarcations in the data set shown in FIG. 8, there is some delay between the time the voice command is recognized and the time at which the data mark would appear. The present system automatically tunes itself to compensate for that delay and properly locate the data mark such that it is at the correct point in the data set (as if instantaneous recognition has been achieved).

Figure 9:
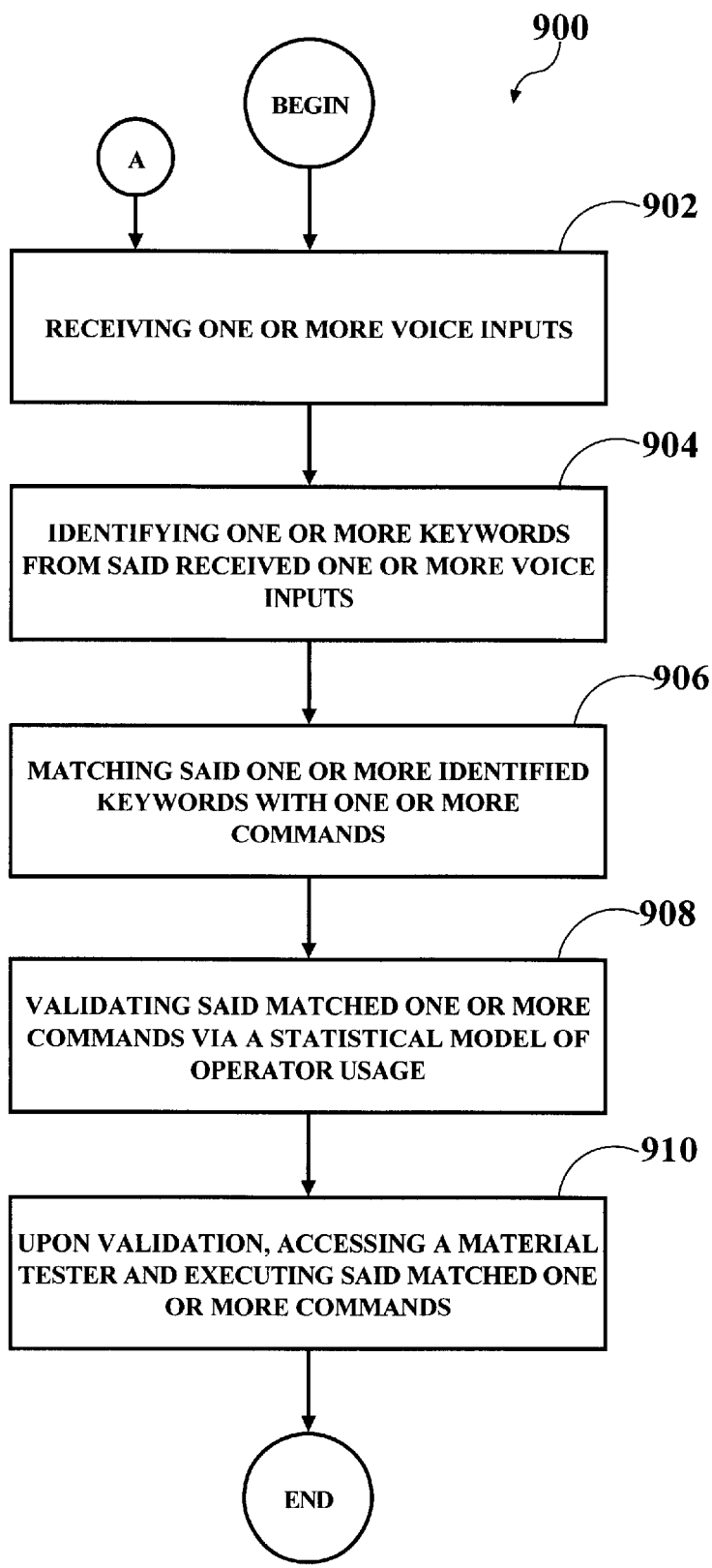
FIG. 9 illustrates the present invention's method for voice actuation and context learning for intelligent machine control.

FIG. 9 illustrates method 900 associated with voice actuation and context learning for intelligent machine control. The method begins by receiving one or more voice inputs (step 902). Next, one or more keywords are identified from the received one or more voice inputs (step 904). Then, the identified keywords are matched with corresponding one or more commands (step 906). Lastly, the matched one or more commands are validated via a statistical model (step 908), and executed in the tester device (step 910).

Figure 10:
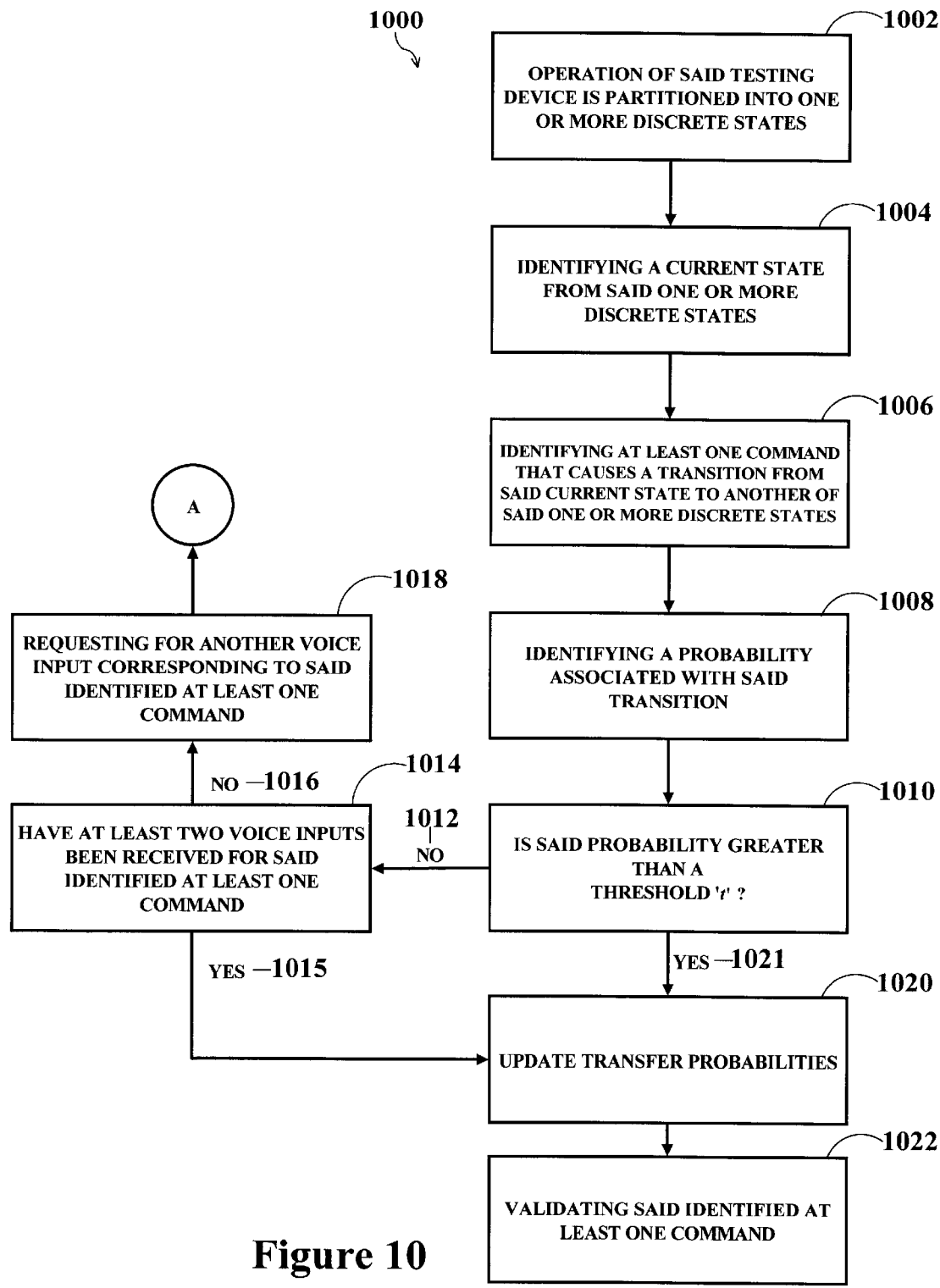
FIG. 10 gives a further breakdown of the validation step described in the method of FIG. 9.

FIG. 10 gives a further breakdown of the method 1000 associated with the validation step (step 908 FIG. 9). In this statistical model of validation, the operation of a testing device is partitioned into one or more discrete states (step 1002). Next, a current state is identified from said one or more discrete states (step 1004). Then, at least one command is identified from received voice inputs that cause a transition from the current state to another discrete state (step 1006). Next, a probability is identified for such a transition (step 1008). A check is then performed to see if the identified probability is greater than a certain threshold 't' (step 1010). In the event that the probability is greater that the threshold 't' (step 1021), the transition probability is updated (step 1020) for this transition step, and the identified command is validated (step 1022). On the other hand, if the threshold test is not met (step 1012), another check is performed to see if at least two voice inputs for the identified command have been received (step 1014), and if so 1015, steps 1020 and 1022 are repeated. In the instance only one voice input has been received for the identified command 1016, the system requests for at least one more voice input (step 1018) and steps 902 to 910 (FIG. 9) are repeated.

Figure 11:
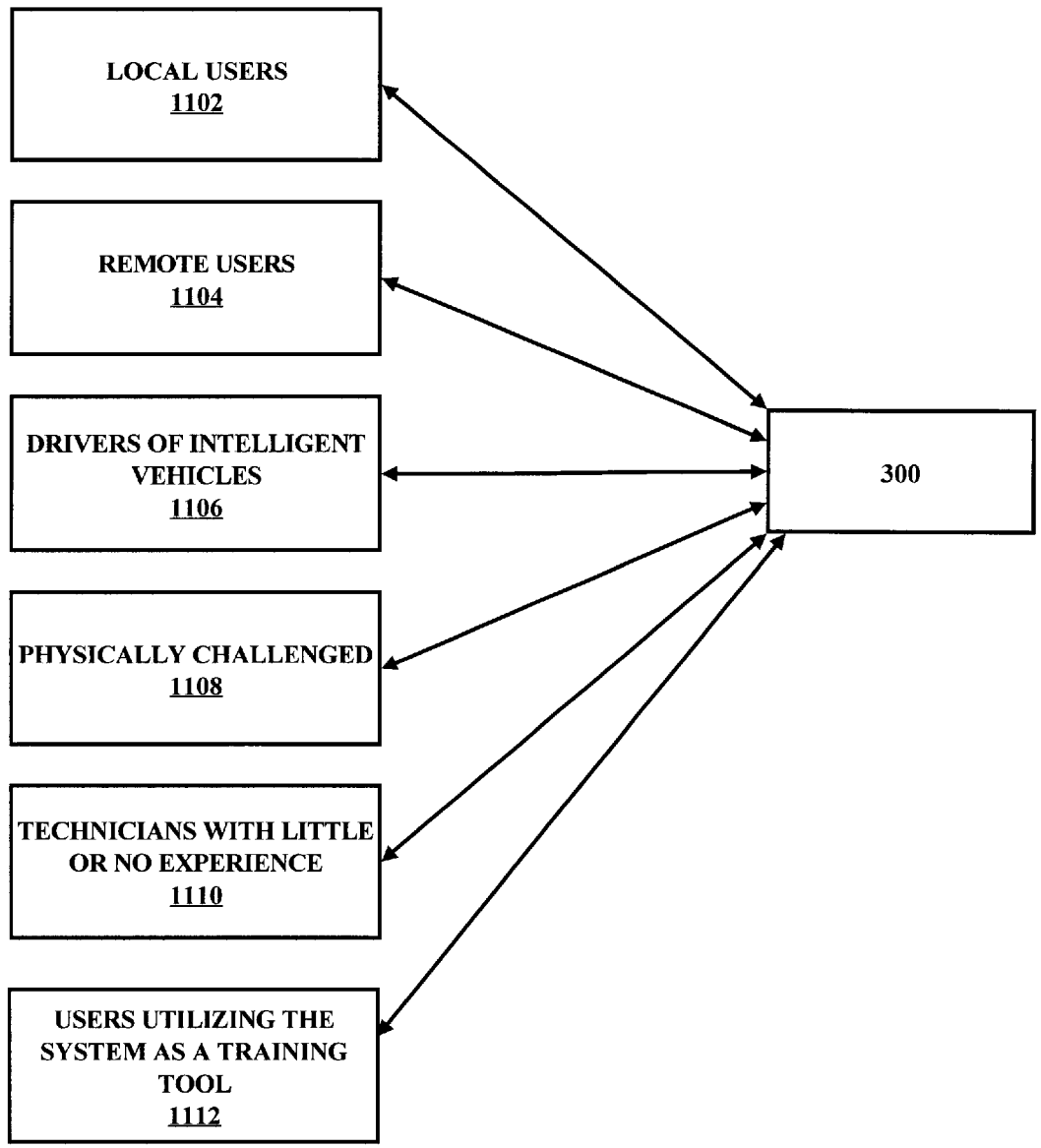

FIG. 11 illustrates the various embodiments the system described in FIG. 3 can be used with. For example, both local users 1102 and remote users 1104 are able to access and implement the system. Furthermore, intelligent vehicles 1106 can be devised to learn a driver's operating pattern and can further be used to adjust the vehicle handling and performance based on the self-learned information. Physically challenged people 1108 can benefit from the system of the present invention because of the easy-to-use voice activated interface. Lastly, technicians with little or no experience 1110 or users utilizing the system as a training tool 1112 benefit from the intelligent help system. Therefore, when transition updates are deactivated (but context help is on), the present system can be utilized as a training tool. It could also be used as a skill evaluation tool by keeping track of the number of incorrect commands that are detected.

Furthermore, the context learning part of the system is not only used for intelligent help, but in combination with the voice response is useful in noisy industrial environments to reduce the chance of accepting misinterpreted commands. In this way, the machine operation with voice actuation becomes more reliable. Essentially, the context learning works as an additional filter before the machine accepts commands.

This added reliability described above makes the system of the present invention useful for voice actuation in noisy environments. One such application for a system with voice actuation in combination with context learning is the cockpit of aircraft. In particular, fighter pilots need accurate speech recognition under noisy conditions.

In yet another embodiment, the intelligent assist function via context sensitive command interpretation is activated but the learning part is turned off. This is useful when non-expert users are on the system and it is not desirable to allow that user to influence modification of the Markov transition probabilities. For example, an expert user would activate the context learning system and develop the transition probabilities that would be correct for a skilled user. Then the transition probability updating can be inhibited. Now less skilled users would be able to use the intelligent help, let the system recommend the next most likely command, etc., but they could not corrupt the established transition probabilities. This would be most useful for training unskilled operators or in a very noisy environment where transition updates would not be desirable.

Therefore, the system and method of the present invention provide for a voice actuated control system with context learning for testing machines such as the tensile testing machine. Furthermore, it features an adaptive command predictor that adds robustness to the voice command interpreter by evaluating each candidate command in the context of the operator's usage pattern. The command predictor is also integrated with a GUI interface panel such that an intelligent user assist function is naturally created. The command predictor is based on a statistical Markov model that adapts to the machine operator's usage patterns. Next, command recommendations are based on probability distributions that are developed online during machine operation. This technology is useful in the industrial setting to reduce operator fatigue, allow freedom of movement, assist the physically challenged, and improve productivity.

Conclusion

A system and method has been shown in the above embodiments for the effective implementation of a voice actuation with contextual learning for intelligent machine control. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware. In addition, the contextual learning function, in one mode, can be selectively disabled while continuing voice actuated control to provide a voice only interface to operate the specific parts of the tensile testing machine.

The above enhancements for icons and its described functional elements are implemented in various computing environments. For example, the present invention may be implemented on a conventional IBM PC or equivalent, multi-nodal system (e.g. LAN) or networking system (e.g. Internet, WWW, wireless web). All programming, GUIs, display panels, screenshots, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of DSP and intelligent control programming.

What is claimed is:

1. A voice actuated system with contextual learning for intelligent machine control, said system comprising:
   speech recognition system receiving voice inputs and identifying one or more voice commands from said received voice input;
   command predictor identifying a probability of likeliness of occurrence of said identified one or more voice commands via a statistical likelihood estimation, said command predictor validating, based upon said identified probability of likeliness of occurrence, said identified one or more voice commands for execution in said machine; and
   command processor receiving and executing in said machine said validated one or more voice commands,
   wherein a command corresponding to the highest probability of likeliness is visually modified to indicate that it is the next likely command.

2. A voice actuated system with contextual learning for intelligent machine control, as per claim 1, wherein said command predictor validates said identified one or more commands for execution in said machine if said probability of likeliness of occurrence is greater than a threshold probability and said command predictor updates said probability of likeliness of occurrence.

3. A voice actuated system with contextual learning for intelligent machine control, as per claim 2, said speech recognition system requests for additional voice inputs for clarification if said probability of likeliness of occurrence of said one or more commands is below said threshold value, and said command predictor validates said one or more commands for execution in said machine upon receiving said additional voice inputs, and said command processor updates said probability of likeliness of occurrence.

4. A voice actuated system with contextual learning for intelligent machine control, as per claim 1, wherein said system further comprises a user interface providing intelligent assistance by revealing a list of probabilities defining the likelihood that one or more commands are next to be executed in said machine.

5. A voice actuated system with contextual learning for intelligent machine control, as per claim 4, wherein said user interface includes displaying:

said list of probabilities;
one or more parameters associated with said machine;
one or more graphs illustrating an output associated with said machine; and
one or more commands for controlling said machine.

6. A voice actuated system with contextual learning for intelligent machine control, as per claim 1, wherein said command predictor is based on a statistical Markov model.

7. A voice actuated system with contextual learning for intelligent machine control, as per claim 1, wherein said machine is an intelligent vehicle.

8. A voice actuated system with contextual learning for intelligent machine control, as per claim 7, wherein said intelligent vehicle learns a driver's operating patterns and adjusts vehicle handling and performance based on said learned information.

9. A voice actuated system with contextual learning for intelligent machine control, as per claim 1, wherein said machine is any of the following: testing equipment, programmable device or programmable industrial instruments.

10. A voice actuated system with contextual learning for intelligent machine control, as per claim 1, wherein said machine is a tensile testing machine.

11. A voice actuated system with contextual learning for intelligent machine control, as per claim 1, wherein, in one mode, said command predictor is disabled.

12. A method for voice actuated contextual learning for intelligent machine control, said machine functionally partitioned into one or more discrete states and associating a present condition of said machine with a current state, said method comprising:
receiving one or more voice inputs;
identifying one or more commands from said received voice inputs;
identifying commands, from said one or more commands, that cause transition between said current state and any of said one or more discrete states and that identify probabilities associated with said transitions;
displaying a graphical user interface providing intelligent help by displaying a list of probabilities defining the likelihood that said one or more commands are next to be executed in said machine;
validating one or more commands, and
executing said validated commands in said machine.

13. A method for voice actuated contextual learning for intelligent machine control, said machine functionally partitioned into one or more discrete states and associating a present condition of said machine with a current state, as per claim 12, wherein said method further comprises:
checking if each of said identified probabilities is greater than a threshold 't', and if so updating corresponding probabilities and validating corresponding commands for execution in said machine, else
requesting another voice input for clarification, and upon clarification, validating corresponding commands, updating corresponding probabilities, and executing said validated one or more commands in said machine.

14. A method for voice actuated contextual learning for intelligent machine control, said machine functionally partitioned into one or more discrete states and associating a present condition of said machine with a current state, as per claim 12, wherein said probabilities are Markov chain probabilities.

15. A method for voice actuated contextual learning for intelligent machine control, said machine functionally partitioned into one or more discrete states and associating a present condition of said machine with a current state, as per claim 12, wherein said method is used in an industrial setting to: reduce operator fatigue, allow freedom of movement, or assist the physically challenged.

16. A method for voice actuated contextual learning for intelligent machine control, said machine functionally partitioned into one or more discrete states and associating a present condition of said machine with a current state, as per claim 12, wherein said machine is a tensile testing machine.

17. A graphical user interface for providing intelligent help in a voice actuated system with contextual learning for intelligent machine control, said interface comprising:
a graphical user interface panel displaying various parameters associated with said machine, and
a probabilities panel displaying Markov state of said machine and probabilities associated with one or more commands, said probabilities defining the likelihood that said one or more commands are next to be executed.

18. A graphical user interface for providing intelligent help in a voice actuated system with contextual learning for intelligent machine control, as per claim 17, wherein a command corresponding to the highest probability is visually modified to indicate that it is the next likely command.

19. An article of manufacture comprising computer usable medium having computer readable code embodied therein which provides a graphical user interface for providing intelligent help in a voice actuated system with contextual learning for intelligent machine control, said computer readable code comprising:
computer readable program code providing a graphical user interface panel displaying various testing parameters and graphs associated with said machine, and
computer readable program code providing a probabilities panel displaying Markov state of said machine and probabilities associated with one or more commands, said probabilities defining the likelihood that said one or more commands are next to be executed.

20. A voice actuated intelligent machine control system for a tensile testing machine, said system operable in a plurality of modes, said system comprising:
in a first mode,
a speech recognition system receiving voice inputs and identifying one or more voice commands from said received voice input to intelligently control specific parts of said tensile testing machine;
a command predictor identifying a probability of likeliness of occurrence of said identified one or more voice commands via a statistical likelihood estimation, said command predictor validating said identified one or more voice commands for execution in said machine;
in a second mode,
a speech recognition system receiving voice inputs and identifying one or more voice commands from said received voice input to intelligently control specific parts of said tensile testing machine;
a command validator validating said identified one or more voice commands for execution in said machine;
in a third mode,
an input recognition system receiving inputs and identifying one or more commands from said received input to intelligently control specific parts of said tensile testing machine;
a command predictor identifying a probability of likeliness of occurrence of said identified one or more voice commands via a statistical likelihood estimation, said command predictor validating said identified one or more commands for execution in said machine, and a command processor, in said first, second, and third modes, receiving and executing in said machine said validated one or more commands.

21. A voice actuated intelligent machine control system for a tensile testing machine, said system operable in a plurality of modes, as per claim 20, wherein a command corresponding to the highest probability of likeliness of occurrence is visually modified to indicate that it is the next likely command.

22. A voice actuated intelligent machine control system for an intelligent vehicle, said system operable in a plurality of modes, as per claim 20, wherein a command corresponding to the highest probability of likeliness of occurrence is visually modified to indicate that it is the next likely command.

23. A system for intelligent machine control with contextual learning, said system comprising:

interface, said interface receiving inputs and identifying one or more commands from said received inputs;

command predictor identifying a probability of likeliness of occurrence of said identified one or more commands via a statistical likelihood estimation and visually modifying a command corresponding to the highest probability to indicate tat it is the next likely command, said command predictor validating said identified one or more commands for execution in said machine; and command processor receiving and executing in said machine said validated one or more commands.

24. A voice actuated intelligent machine control system for an intelligent vehicle, said system operable in a plurality of modes, said system comprising:

in a first mode, a speech recognition system receiving voice inputs and identifying one or more voice commands from said received voice input to intelligently control specific parts of said intelligent vehicle;

a command predictor identifying a probability of likeliness of occurrence of said identified one or more voice commands via a statistical likelihood estimation, said command predictor validating said identified one or more voice commands for execution in said intelligent vehicle;

in a second mode, a speech recognition system receiving voice inputs and identifying one or more voice commands from said received voice input to intelligently control specific parts of said intelligent vehicle;

a command validator validating said identified one or more voice commands for execution in said intelligent vehicle;

in a third mode, an input recognition system receiving inputs and identifying one or more commands from said received input to intelligently control specific parts of said intelligent vehicle;

a command predictor identifying a probability of likeliness of occurrence of said identified one or more voice commands via a statistical likelihood estimation, said command predictor validating said identified one or more commands for execution in said intelligent vehicle; and a command processor, in said first, second, and third modes, visually modifying a command corresponding to the highest probability of likeliness to indicate that it is the next likely command and said command processor receiving and executing in said intelligent vehicle said validated one or more commands.

* * * * *